(12) United States Patent
Glassner et al.

(10) Patent No.: US 11,436,708 B1
(45) Date of Patent: Sep. 6, 2022

(54) REMOVING MOVING OBJECTS FROM A VIDEO SCENE CAPTURED BY A MOVING CAMERA

(71) Applicant: Weta Digital Limited, Wllington (NZ)

(72) Inventors: Andrew Glassner, Wellington (NZ); Peter Hillman, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 0 days.

(21) Appl. No.: 17/409,616

(22) Filed: Aug. 23, 2021

Related U.S. Application Data

(60) Provisional application No. 63/235,095, filed on Aug. 19, 2021.

(51) Int. Cl.
| | | |
|---|---|---|
| G06T 5/00 | (2006.01) | |
| G06T 5/50 | (2006.01) | |
| G06T 7/55 | (2017.01) | |
| G06T 7/70 | (2017.01) | |
| G06T 7/90 | (2017.01) | |
| H04N 5/91 | (2006.01) | |
| H04N 9/67 | (2006.01) | |

(52) U.S. Cl.
CPC ............... *G06T 5/005* (2013.01); *G06T 5/50* (2013.01); *G06T 7/55* (2017.01); *G06T 7/70* (2017.01); *G06T 7/90* (2017.01); *H04N 5/91* (2013.01); *H04N 9/67* (2013.01); *G06T 2207/10016* (2013.01); *G06T 2207/10024* (2013.01); *G06T 2207/10028* (2013.01)

(58) Field of Classification Search
CPC .. G06T 5/005; G06T 5/50; G06T 7/55; G06T 7/70; G06T 7/90; G06T 2207/10016; G06T 2207/10024; G06T 2207/10028; H04N 5/91; H04N 9/67
See application file for complete search history.

(56) References Cited

U.S. PATENT DOCUMENTS

| | | | |
|---|---|---|---|
| 5,454,050 A | | 9/1995 | Nakabayashi |
| 5,732,107 A | * | 3/1998 | Phillips ................ H03H 17/028 375/229 |
| 5,953,075 A | | 9/1999 | Nagata |

(Continued)

OTHER PUBLICATIONS

SiamMask (https://github.com/foolwood/SiamMask)—7 pages.

*Primary Examiner* — Yubin Hung
(74) *Attorney, Agent, or Firm* — Trellis IP Law Group, PC

(57) ABSTRACT

Methods, an apparatus, and software media are provided for removing unwanted information such as moving or temporary foreground objects from a video sequence. The method performs, for each pixel, a statistical analysis to create a background data model whose color values can be used to detect and remove the unwanted information. The method assumes that for each pixel the background is present in a majority of the frames. The camera that records the video sequence may move relative to the geometry of the video scene. A pixel in a first frame is matched to a location in the geometry. The method determines color values of pixels, matched to the location in the geometry, in successive frames and clusters color values to determine a background color value range. It may use quadratic or better interpolation and extrapolation to determine background color values for unavailable frames.

14 Claims, 8 Drawing Sheets

(56) References Cited

U.S. PATENT DOCUMENTS

| | | | |
|---|---|---|---|
| 6,738,424 B1* | 5/2004 | Allmen | G06T 9/001 |
| | | | 375/240.08 |
| 6,904,182 B1* | 6/2005 | Simard | B43L 1/00 |
| | | | 382/274 |
| 7,015,978 B2 | 3/2006 | Jeffers | |
| 8,194,986 B2 | 6/2012 | Conwell | |
| 8,300,890 B1* | 10/2012 | Gaikwad | G06K 9/00771 |
| | | | 382/103 |
| 8,325,214 B2 | 12/2012 | Hildreth | |
| 8,411,149 B2 | 4/2013 | Maison | |
| 8,755,837 B2 | 6/2014 | Rhoads | |
| 9,013,634 B2 | 4/2015 | Agarwala et al. | |
| 9,031,279 B2 | 5/2015 | Gefen | |
| 9,105,093 B2 | 8/2015 | Schlosser | |
| 10,092,220 B2 | 10/2018 | Mauro | |
| 10,109,092 B1 | 10/2018 | Hitchings, Jr. | |
| 10,839,573 B2 | 11/2020 | Marino | |
| 10,964,288 B2 | 3/2021 | Walker | |
| 11,010,894 B1* | 5/2021 | Shenk | G06K 9/00362 |
| 11,017,558 B2 | 5/2021 | Noble | |
| 2004/0126014 A1* | 7/2004 | Lipton | G06T 7/194 |
| | | | 382/173 |
| 2006/0064384 A1* | 3/2006 | Mehrotra | G08B 13/19608 |
| | | | 705/57 |
| 2008/0235795 A1* | 9/2008 | Ishikawa | G06F 21/10 |
| | | | 726/22 |
| 2010/0135634 A1* | 6/2010 | Ito | H04N 9/67 |
| | | | 386/302 |
| 2010/0239122 A1* | 9/2010 | Busch | G06T 15/04 |
| | | | 382/103 |
| 2010/0316291 A1* | 12/2010 | Deng | G06K 7/10544 |
| | | | 382/166 |
| 2011/0058016 A1* | 3/2011 | Hulyalkar | H04N 19/597 |
| | | | 348/42 |
| 2013/0128121 A1* | 5/2013 | Agarwala | H04N 13/221 |
| | | | 348/607 |
| 2013/0229695 A1* | 9/2013 | Lei | H04N 1/38 |
| | | | 358/448 |
| 2013/0321637 A1* | 12/2013 | Frank | H04N 5/2257 |
| | | | 348/152 |
| 2015/0095189 A1* | 4/2015 | Dharssi | G07G 1/0081 |
| | | | 705/26.8 |
| 2016/0379055 A1* | 12/2016 | Loui | G06K 9/6224 |
| | | | 382/103 |
| 2017/0187983 A1* | 6/2017 | Lawrence | G11B 27/36 |
| 2017/0193644 A1* | 7/2017 | Fry | G06T 11/60 |
| 2017/0278289 A1* | 9/2017 | Marino | G06T 11/60 |
| 2017/0330050 A1* | 11/2017 | Baltsen | G06K 9/342 |
| 2018/0082442 A1* | 3/2018 | Saitwal | G06K 9/40 |
| 2018/0309978 A1* | 10/2018 | Nobori | G06T 7/85 |

* cited by examiner

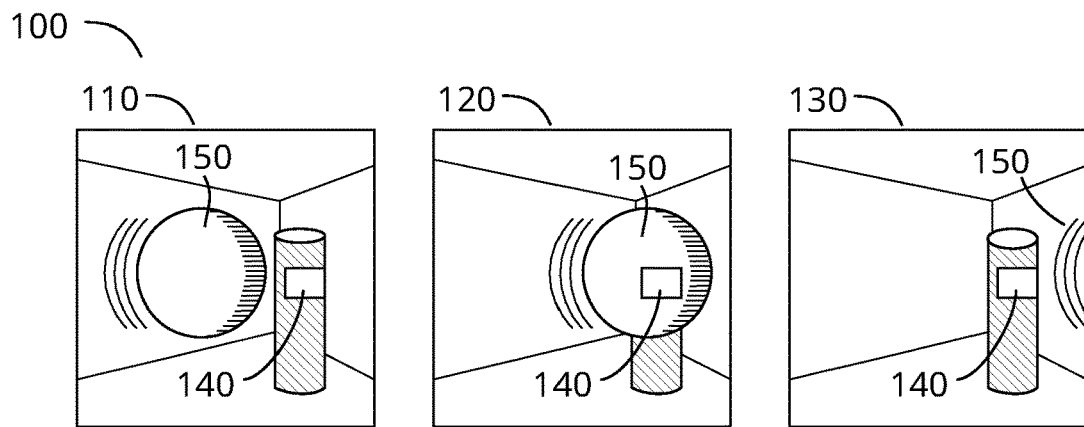
FIG. 1 - Moving Object Detection
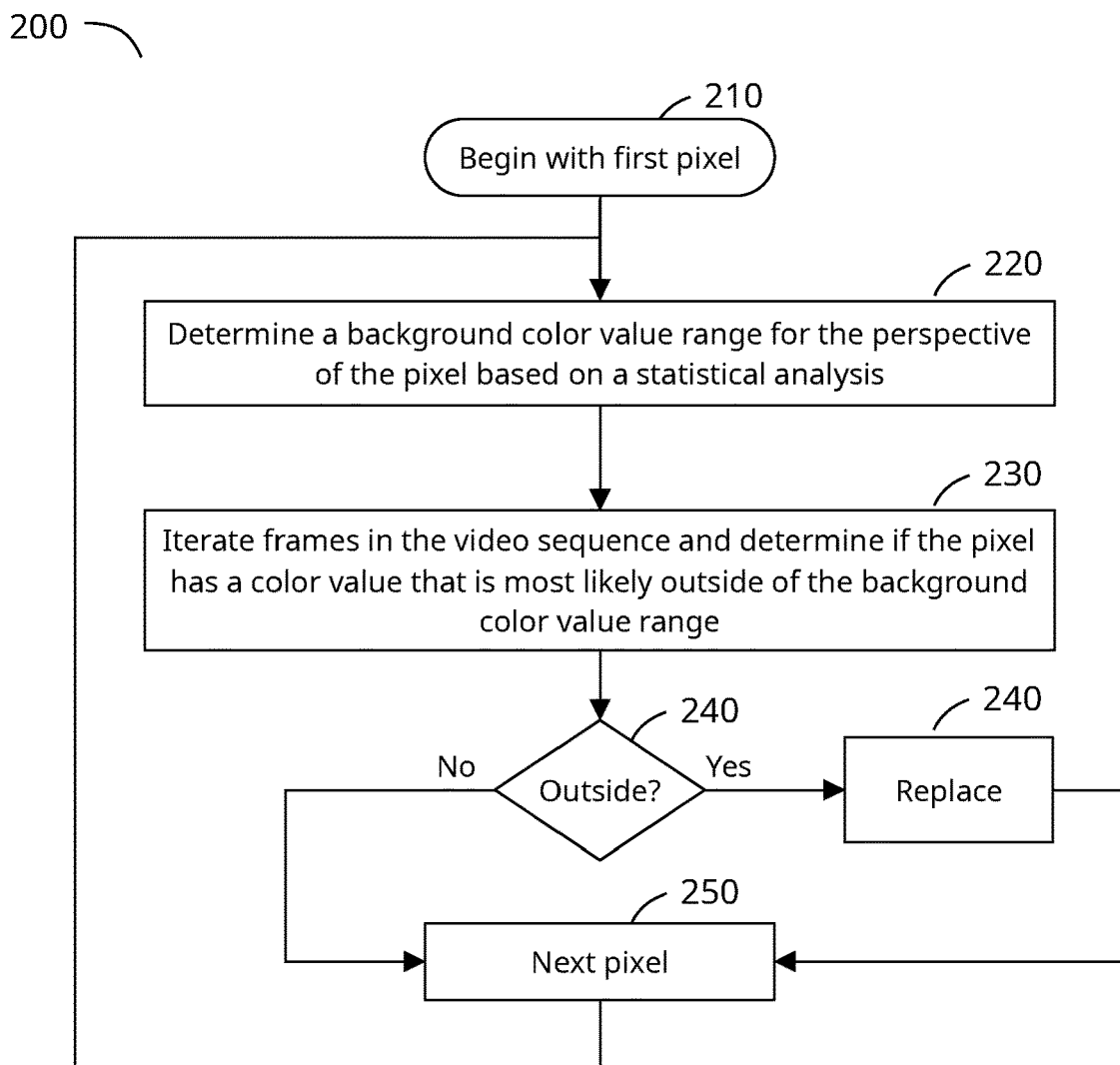
FIG. 2 - Moving Object Removal

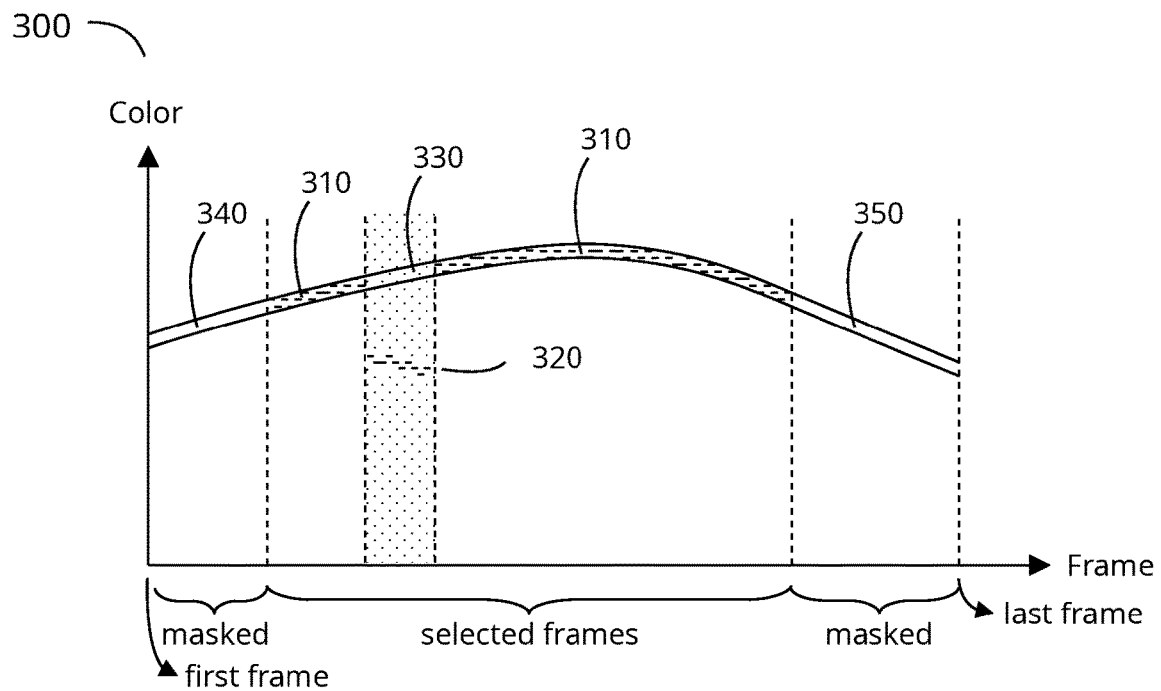
FIG. 3 – Background Color Value Range and Trend
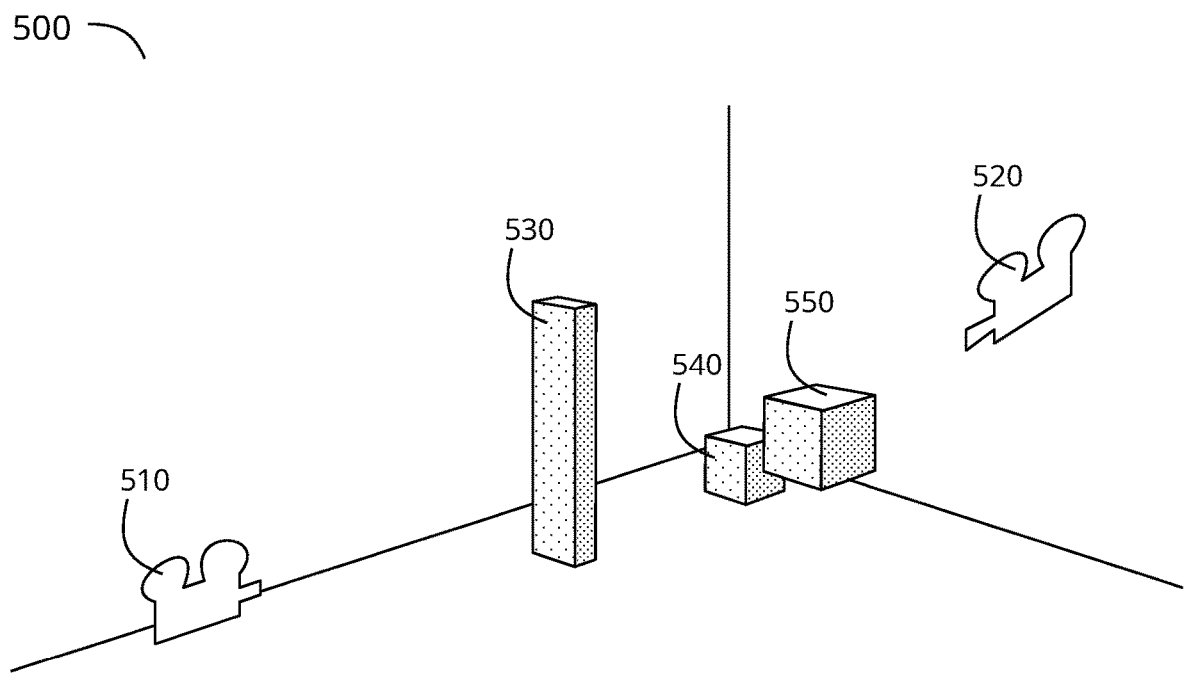
FIG. 5 – Scene Recorded by a Moving Camera

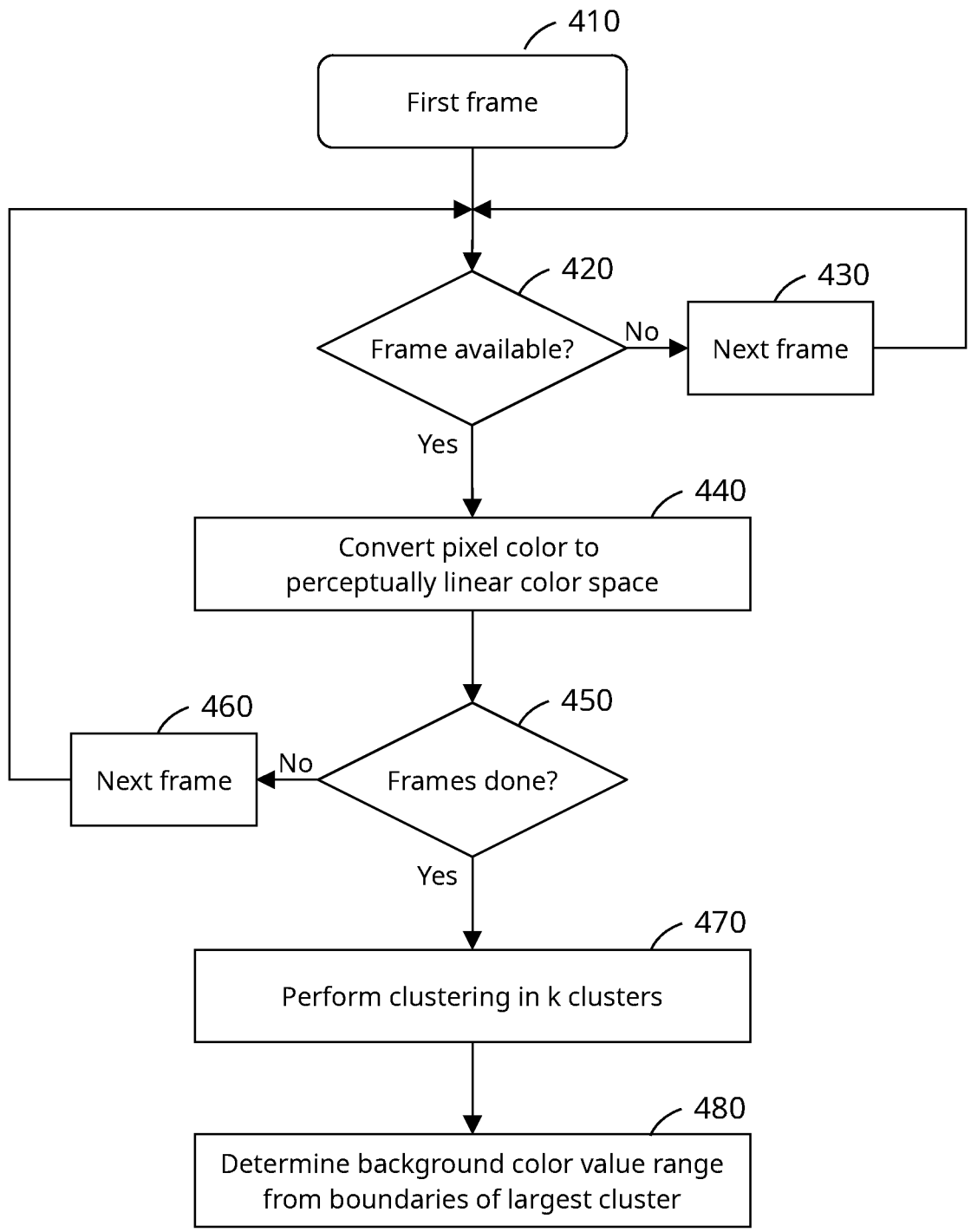
FIG. 4 - Determining Color Value Range

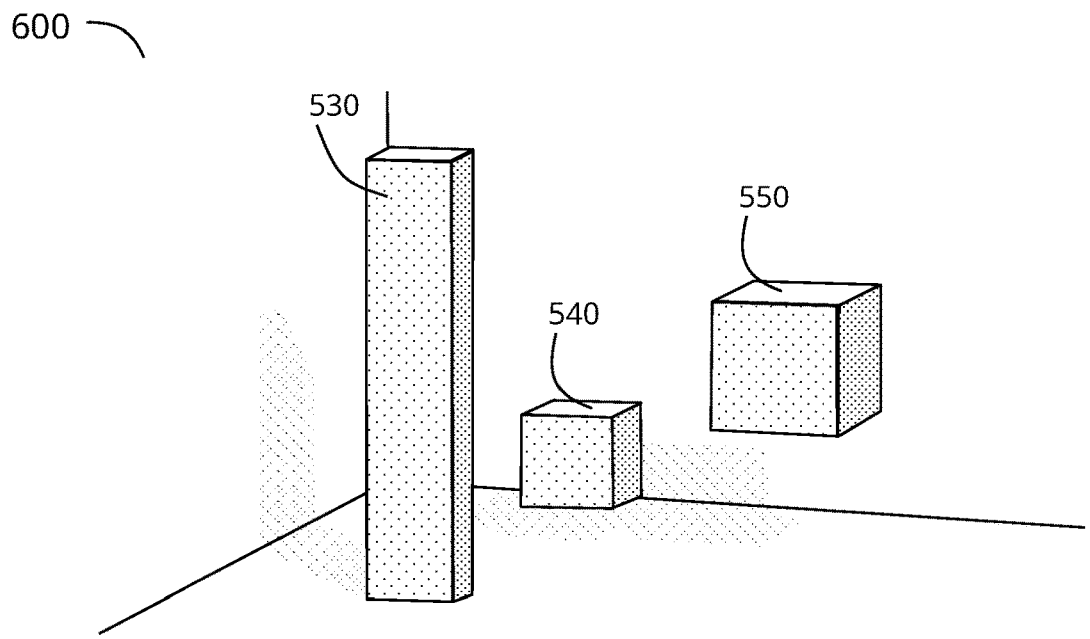
FIG. 6 - Initial Perspective
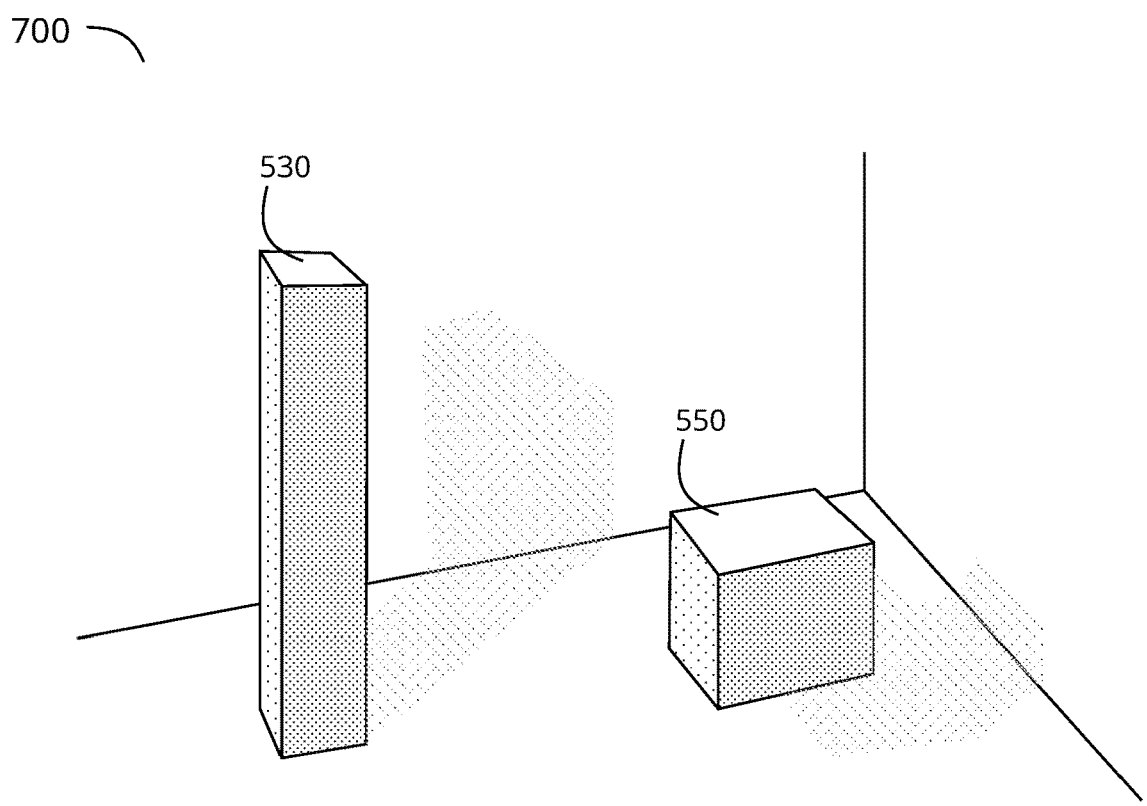
FIG. 7 - Final Perspective

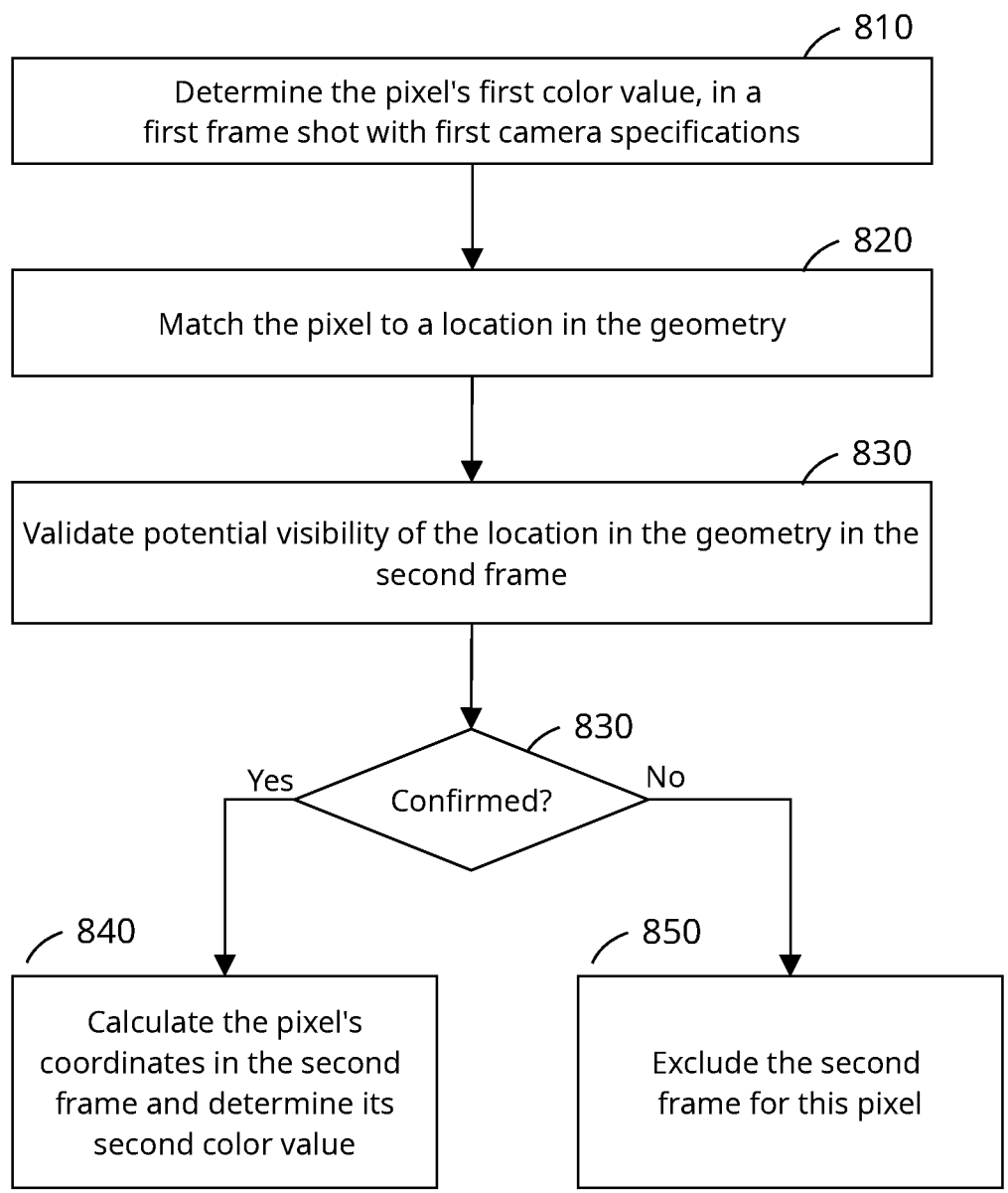
FIG. 8 - Determining Color Range from Moving Camera

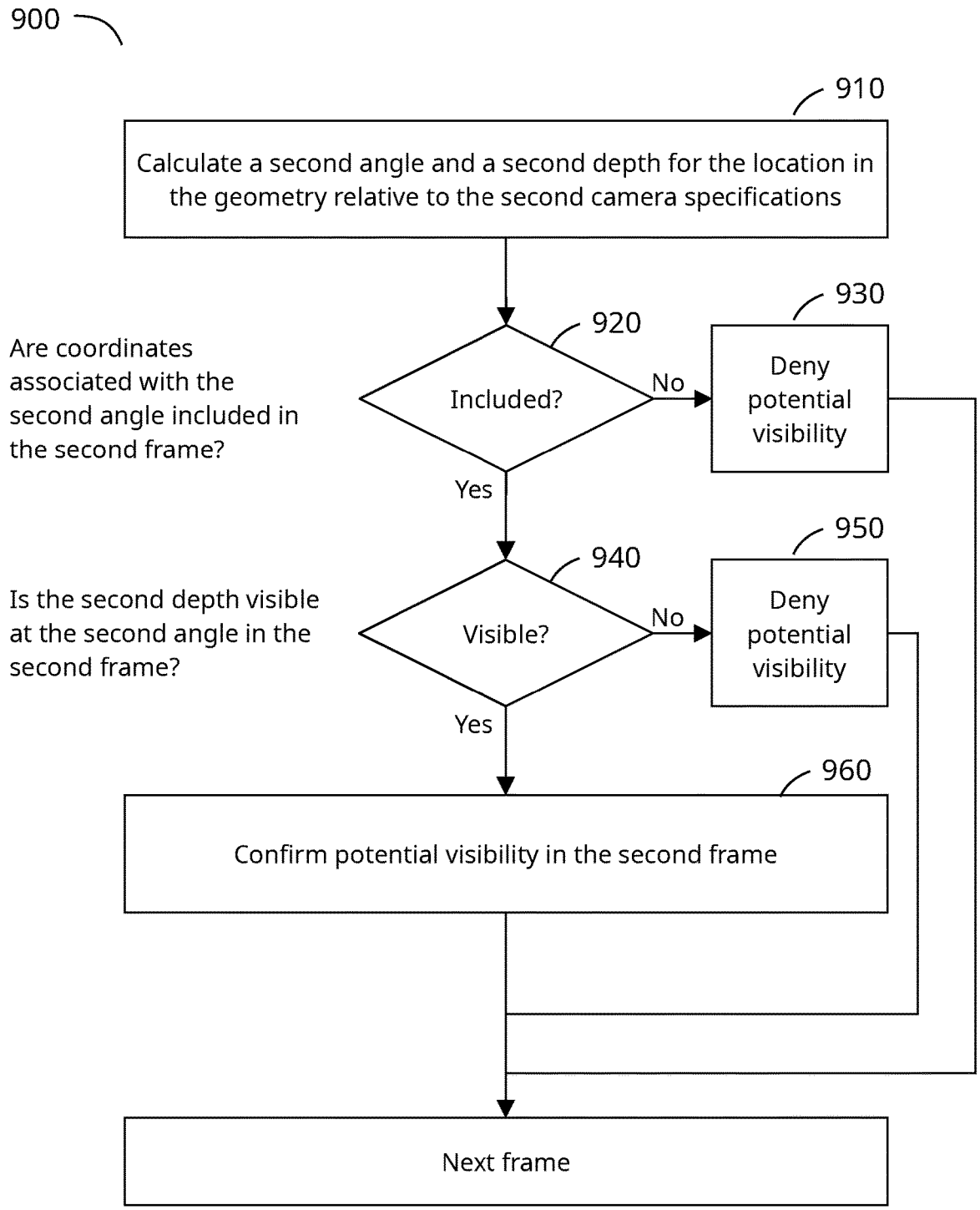
FIG. 9 - Validating Potential Visibility of a Viewed Object

REMOVING MOVING OBJECTS FROM A VIDEO SCENE CAPTURED BY A MOVING CAMERA

CROSS REFERENCES TO RELATED APPLICATIONS

This application claims priority from U.S. provisional patent application Ser. No. 63/235,095, entitled "Removing Moving Objects from a Video Scene", filed Aug. 19, 2021, which is hereby incorporated by reference as if set forth in full in this application for all purposes. This application is also related to U.S. patent application Ser. No. 17/409,619, entitled "Replacing Moving Objects with Background Information in a Video Scene", filed concurrently herewith, which is hereby incorporated by reference as if set forth in full in this application for all purposes.

BACKGROUND

Technical Field

The disclosed implementations relate generally to tools and methods used in video and graphics rendering, and in particular to those for removing undesired objects moving through a video scene.

Context

Unless otherwise indicated herein, elements described in this section are not prior art to the claims and are not admitted being prior art by inclusion in this section. The need to remove undesired objects from photographs and video scenes has been recognized for a long time. Historically, objects were removed manually—a painstaking process even for a single photograph. A video sequence has many more images to be manipulated, making it impractical to perform the task manually. The availability of high-resolution digital cameras and large amounts of compute power have made video manipulation feasible. Adobe After Effects™, a recent product of Adobe Inc., allows users to place a selection mask or bounding box around an object to remove. The mask or box may move with the object through successive frames in the scene. Information inside (i.e., covered by) the mask is removed, and the resulting hole seems to be in-painted, perhaps using the method in U.S. Pat. No. 9,013,634 by Agarwala et al., "Methods and Apparatus for Video Completion". Other recent projects, such as SiamMask (https://github.com/foolwood/SiamMask) use artificial intelligence for the in-painting. However, the prior art methods may leave ghosts and other artifacts, and are often not suitable for application in a studio setting.

SUMMARY

To remove moving objects (i.e., temporary foreground objects) from a video sequence, implementations replace the color values of pixels depicting a foreground object with color values of the same pixels from a background data model derived from frames in which the foreground object was not obscuring that part of the background or object. Building the background data model relies on foreground objects being present in a minority of the frames for which a pixel is analyzed. Implementations treat a scene as if it were recorded from a single vantage point. From a still camera, it is possible to determine statistics and trends for each pixel, and replace pixel values that deviate. In the case of a moving camera, a synthesis of all or a portion of the video sequence is created—as if the moving camera had kept its current frame position throughout the sequence. Then, similar approaches to the stationary camera case can be used to remove foreground moving objects. In one implementation with a moving camera, moving object removal includes collecting the color values for each pixel in a frame, and transforming other frames in the video sequence to match the perspective of the frame whose background data model is being constructed, so that the transformed frame provides information for the statistical analysis. Transformation may use accurate information about the moving camera's position and orientation for all frames. It may also require depth information for each pixel. The depth information can be obtained in several ways, for example by using a LiDAR (Light Detection and Ranging) in parallel with the camera at the time of recording the original scene, or by collecting the LiDAR information beforehand or afterwards. Another possibility is to record the scene from multiple angles to allow for depth triangulation or use artificial intelligence to create depth estimates from images.

In a first aspect, an implementation provides a method for removing information from a video sequence. The video sequence includes a series of frames with pixels recorded by a main camera with known camera specifications that may change during the video sequence. The method is performed for at least a first pixel in a first frame. The first frame is associated with a geometry, and the first pixel is associated with a location in the geometry. A user may use a mask to exclude pixels and/or frames. The method determines a background color value range for a perspective of the first pixel based on a statistical analysis; it iterates frames in the video sequence to determine for which frames a third pixel, associated with the location in the geometry, has a color value most likely outside of the background color value range; and in those frames, it replaces the third pixel's color value with a color value that is inside the background color value range. The background color value range may be constant over the frames, or it may include a trend, which may be linear, quadratic, polynomial, or otherwise. The video sequence may be recorded by a camera with a fixed position and orientation. The statistical analysis may include determining a prevalent color cluster. This may include converting the pixel color to a perceptually linear color space such as CIELAB, and using k-means clustering with k=2.

Determining the background color value range may start with determining a first color value of the first pixel based on coordinates for the first pixel in the first frame, wherein the first frame is shot with a first camera specification. The implementation matches the first pixel to the location in the geometry by calculating a first angle and a first depth for the first pixel based on the coordinates for the first pixel and the first camera specification. Based on the location in the geometry and a second camera specification associated with a second frame, the implementation validates potential visibility of the location in the geometry in the second frame. Upon confirming the potential visibility, the implementation calculates coordinates for a second pixel in the second frame, associated with the location in the geometry, and determines a second color value of the second pixel.

Validating potential visibility of the location in the geometry in the second frame may include calculating a second angle and a second depth of the location in the geometry relative to the second camera specification. The implementation determines if coordinates associated with the second angle are included in the second frame. If so, it determines if the second depth is not occluded at the second angle in the second frame. When it determines that the coordinates associated with the second angle are included in the second frame, and that the second depth is not occluded at the second angle in the second frame, the implementation confirms the potential visibility.

In a second aspect, an implementation provides an apparatus including one or more processors and logic encoded in one or more tangible non-transitory media for execution by the one or more processors. The apparatus performs the methods described for implementations in the first aspect.

In a third aspect, an implementation provides software in one or more non-transitory computer-readable media including instructions for performing the methods described for implementations in the first aspect.

A further understanding of the nature and the advantages of particular implementations disclosed herein may be realized by reference of the remaining portions of the specification and the attached drawings.

BRIEF DESCRIPTION OF THE DRAWINGS

The invention will be described with reference to the drawings, in which:

FIG. 1 illustrates a basic method for detecting a temporary or moving foreground object in a video sequence according to an implementation of the invention;

FIG. 2 illustrates an example method for removing temporary foreground objects from a video sequence according to an implementation of the invention;

FIG. 3 illustrates an example background color value range and trends in a background color value range according to an implementation of the invention;

FIG. 4 illustrates an example method for determining a pixel's background color value range in an implementation of the invention;

FIG. 5 illustrates an example scene with initial and final camera positions and orientations according to an implementation of the invention;

FIG. 6 illustrates the perspective from the initial camera position in FIG. 5;

FIG. 7 illustrates the perspective from the final camera position in FIG. 5;

FIG. 8 illustrates a method for determining a pixel's background color value range for a video sequence recorded by a moving camera according to an implementation of the invention;

FIG. 9 illustrates detailed steps of validating potential visibility of the location in the geometry in the second frame in an implementation of the invention;

Figure 10:
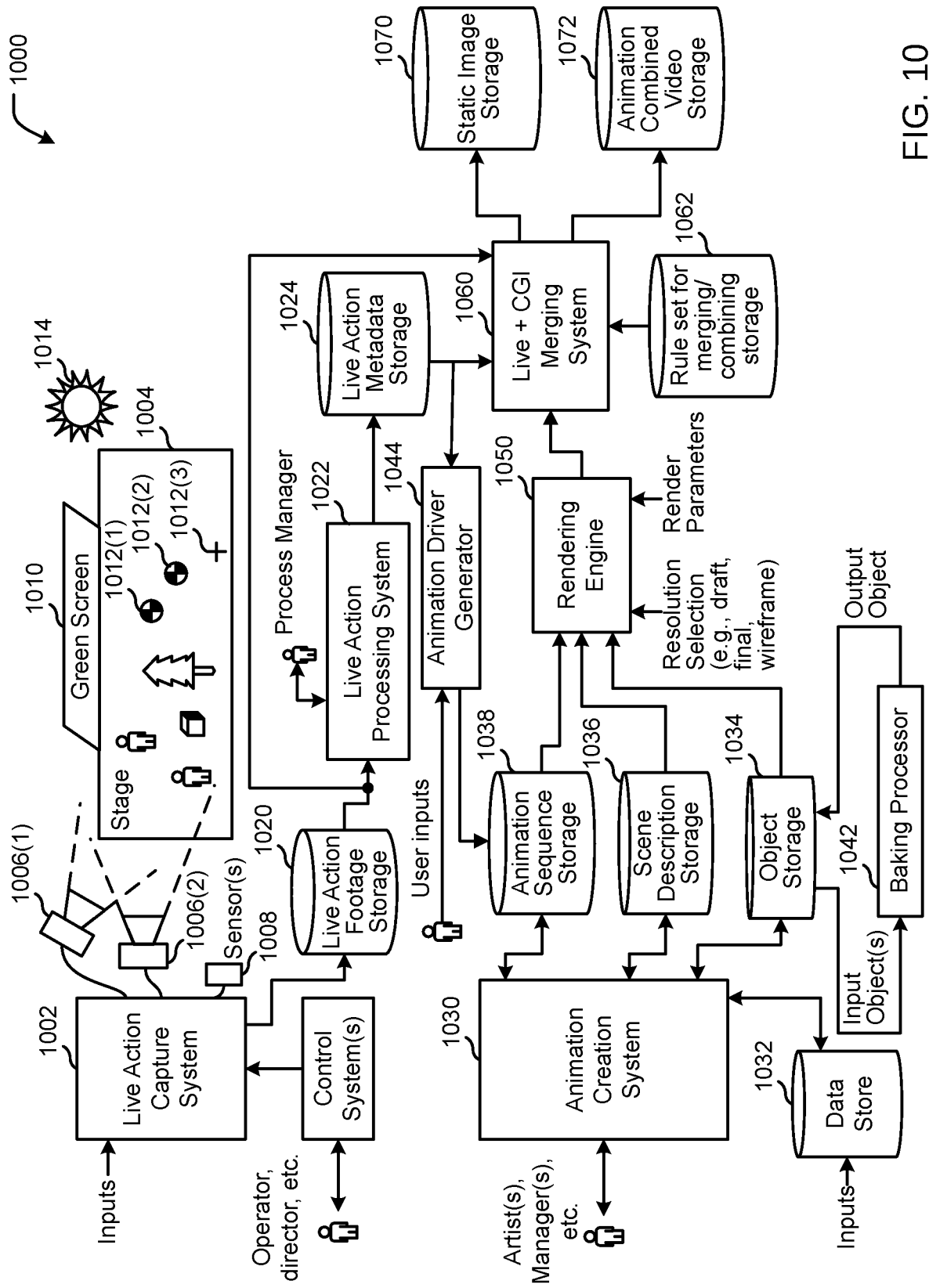
FIG. 10 illustrates an example of a visual content generation system.

In the figures, like reference numbers may indicate functionally similar elements. The systems and methods illustrated in the figures, and described in the Detailed Description below, may be arranged and designed in a wide variety of different implementations. Neither the figures, nor the Detailed Description, are intended to limit the scope as claimed. Instead, they merely represent examples of different implementations of the invention.

DETAILED DESCRIPTION

Terminology

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable non-transitory storage medium, such as random-access memory (RAM), read-only memory (ROM), magnetic or optical disk, or other tangible media suitable for storing instructions for execution by the processor.

The term "server" and "client" generally refer to separate systems that provide and consume information, respectively. A client may request a server for information, and the server may respond with the requested information. Additionally, a client may provide a server information, which the server may store in, for example, a database, for later use. The terms "client" and "server" are relative, and in some cases the roles may switch. However, the server is often considered to be a larger system serving multiple clients, which may be relatively smaller systems.

Background data model—a data model for one pixel, or collectively for a scene, that is based on a statistical analysis and that provides information about the pixel or scene's background. The background data model may include a pixel's color and depth, and may include a formula, a procedure, computer code, statistical parameters such as ranges, trends, averages, moments, variances, and any other data that define, interpolate, extrapolate, or otherwise express or predict the background information. Interpolation and extrapolation may be linear, quadratic, cubic, etc., i.e., uses a linear, quadratic, cubic, etc., formula.

Camera specifications—the camera position, orientation, zoom factor, and other relevant configuration parameters.

CIE—the International Commission on Illumination.

CIELAB—a perceptually linear color space, also referred to as L*a*b and standardized by CIE in ICC. 1:2004-10 (or later versions). CIELAB is a reference color representation used by, among others, the paper manufacturing and graphic arts industries.

CIEXYZ—a color space first standardized by CIE in 1931.

CGI—Computer-generated imagery—computer-graphic effects in films, television programs, and other visual media LiDAR—Light Detection and Ranging Mask—a bounding box or other shape projected on a frame or video sequence that excludes or includes pixels and/or frames. A mask may be positive (excluding pixels and/or frames) or negative (including pixels and/or frames). By masking or de-masking, a user may exclude or include any pixels and/or frames from any method, or part of a method, described herein.

RAM—Random-Access Memory

ROM—Read-Only Memory

Video sequence—a series of successively recorded and/or generated frames documenting a scene. The vantage point and perspective may be fixed or may gradually change in a video sequence.

Implementations

FIG. 1 illustrates a basic method 100 for detecting a temporary or moving foreground object in a video sequence according to an implementation of the invention. The basic method assumes that the video sequence is or has been captured by a main camera with fixed camera specifications, which limitation will be removed in an extension of the method, as described with reference to FIG. 8. The video sequence includes a series of frames. Each frame has pixels, and method 100 is applied to one pixel at a time. A user may apply a mask to reduce the video information handled by method 100. FIG. 1 shows three frames: frame 110, frame 120, and frame 130. The frames show a room with a cylindrical object. The method looks at each pixel in the scene. To understand method 100, consider just pixel 140, whose size has been exaggerated for clarity. In frame 110, pixel 140 captures a part of the cylindrical object. A moving object, ball 150, flies through the scene, but is not yet occluding pixel 140. Thus, pixel 140 captures a color value of the cylindrical object. In frame 120, ball 150 flies in front of the cylindrical object, occluding it. Pixel 140 captures a color value of ball 150 and that is different than the color value of the cylindrical object. In frame 130, ball 150 has moved out of the scene, and pixel 140 once more captures the color value of the cylindrical object. The color value may have changed a little bit due to varying lighting conditions, but overall it will be close to the color value in frame 110. Thus, for a majority of the frames, the color value captured in pixel 140 falls within a tight range, and for a minority of the frames it falls well outside the tight range. More generally, by performing a statistical analysis, method 100 determines the tight range, extends it to frames for which the pixel's color value is outside of the tight range, and builds a background data model. The tight range may be an average with a variance or other margin if the background lighting conditions don't change. Or it may vary, for example it may include a slow change (a trend), or multiple slow changes (multiple trends). By determining the frames in which the color value in pixel 140 falls outside the tight range, method 100 can detect a temporary foreground object (such as ball 150) moving in front of the background (such as the cylindrical object). In some implementations the statistical analysis is simple, and it may include a simple majority check. In other implementations the statistical analysis may include determining a prevalent color cluster. In further implementations the statistical analysis may include color clustering, trend analysis, incidence ranking, and/or any other analysis known in the art. Clusters may be separated by hard borders, or by likelihood ranges in which it is not certain to determine whether a color value is in one cluster or another, but the likelihood can be determined, and it can be determined if a color value is most likely in one cluster or another.

By repeating method 100 for each pixel, an implementation may create a detailed background data model that includes a background color value range for each pixel. A user may mask pixels, for example, by drawing a mask over an area of interest. The mask may exclude part or all of the pixels, and part or all of the frames in the video sequence. Even if the mask excludes part of the frames in the video sequence, method 100 may assume that the background data model remains valid for all frames in the video sequence.

FIG. 2 illustrates an example method 200 for removing temporary foreground objects from a video sequence according to an implementation of the invention. A temporary foreground object may be a moving object, such as ball 150 in method 100. The video sequence includes a series of frames. Method 200 includes the following steps.

Step 210—beginning with a first pixel. For further pixels, method 200 performs Step 220 to Step 240.

Step 220—determining a background color value range for the pixel based on a statistical analysis, for example based on a majority of the frames. An implementation may count color values for the pixel in the frames. If a color value, or a color in a tight range of values, appears in more than half the frames, then the color is deemed to be a background color, i.e., the color of an object in the background. Some implementations may perform more advanced statistical methods to group or cluster color values and analyze trends. Further implementations may use unsupervised or supervised learning from previously analyzed pixels to more rapidly construct a background model that includes the background color value range for a presently analyzed pixel.

Step 230—iterating frames in the video sequence and determining if the pixel has a color value that is most likely outside of the background color value range.

Step 240—upon determining that for a frame in the video sequence the pixel has a color value that is most likely outside of the background color value range, replacing the pixel's color value in the frame with a color value that is inside the background color value range.

By detecting a temporary foreground object, a moving object, or any other temporary anomaly, and replacing its pixels' color values by color values from a background data model, method 200 removes such objects or information from the video sequence. By using a mask, or multiple masks, a user limits the number of pixels to analyze in the video sequence, and limits the expense to build the background data model. It may also limit the size of the background data model, and hence the area in which moving objects may be replaced. Some implementations may reduce the number of frames used for the analysis by skipping part of the frames, for instance by skipping every other frame.

FIG. 3 illustrates an example background color value range 300 and trends in the background color value range according to an implementation of the invention. The example shows a color graph for a pixel, including a color sample for each frame. The horizontal axis shows the frames in the video sequence, and the vertical axis shows the color value, which for ease of this example is shown in one dimension. Many practical implementations may use CIELAB (a perceptually linear color space), or red, green, and blue, or any combination thereof. In this example, some frames are masked, and in other frames the pixel is occluded by a foreground object. The area 310 shows samples whose color values are all within a tight band of each other. As shown, area 310 covers most of the frames. However, samples in area 320 have quite different color values. Method 200 above decides that samples in area 310 represent the color of a background object, and that samples in area 320 represent the color of a temporary foreground object. The method interpolates colors from area 310 to create predictions for the background color for the frames in which the background is occluded, such as area 330. For the interpolation, it may take any subset of the frames in area 310. For example, an implementation may use all frames in area 310. Another example implementation may take one or more frames out of the area 310 that is to the left of area 330 and one or more frames out of the area 310 that is to the right of area 330. Interpolation may be linear, use a quadratic equation, or use a polynomial with any number of factors, or interpolation may use any other method known in the art. Experiments have shown that acceptable results are achieved with interpolation that uses at least a quadratic equation, and for even better results, interpolation uses a cubic equation. In this example, since not all frames provide background information, method 200 extrapolates area 310 to area 340 and area 350 with likely color values for the background at the pixel. Again, for the extrapolation, the method may use any subset of the frames in area 310. Extrapolation may be linear, use a quadratic equation, or a polynomial with any number of factors, or extrapolation may use any other method known in the art. Area 310 may constitute part of the background data model of the pixel. The example shows clear trends that increase until about 60% of the video sequence, and decrease, more rapidly, after that.

To determine which colors are within background color value range 300 and represent a pixel's background, some implementations may perform k-means clustering. K-means clustering is well known in the art (see for instance https://en.wikipedia.org/wiki/K-means_clustering). Other implementations may include other methods of clustering known in the art. K-means clustering allows a set of datapoints to be grouped into k different clusters. A video pixel may, for example, be expressed in a three-dimensional space, such as red-green-blue (RGB), CIEXYZ, or CIELAB. An advantage of using a clustering algorithm such as k-means is that the algorithm does not need a predetermined margin, or distance between clusters. Based on the data it receives, and the requested number k of clusters, the algorithm determines its clusters in the three-dimensional space, or in whatever dimensional space the data is given.

Although it may seem that a straightforward color space such as red-green-blue (RGB) would always be sufficient to represent a pixel for the purpose of clustering, this is not always correct. While it is a machine that decides which of the frames represent a pixel's background object, and which represent a foreground object, ultimately a human will view the results of using the background data model. The situation is not necessarily binary (background versus foreground), since some frames that genuinely represent the pixel's background object should not qualify for building the background data model. This can be the case if the pixel's color changes because of a change in lighting due to a movement elsewhere in the picture. This could give a relatively small change in color in the RGB space, whereas a human might perceive it as a big change. Conversely, there are also situations in which a pixel's color might change a lot in the RGB space, but not much for human perception. Thus, an implementation may use a perceptually linear color space to perform the clustering, for example CIELAB, Hunter Lab, or any other perceptually linear color space known or used in the art.

An implementation may determine background color value range 300 by performing k-means clustering with a value k=2. The clustering will divide pixel values between a largest cluster for the background color value, and a second smaller but perhaps more distributed cluster for any other color values. To determine if a pixel color is from the background, an implementation merely needs to determine if the pixel's color is in the cluster with the most samples. To build a background data model, an implementation may use all, or any part of, the color values in the first cluster, and perform interpolation, extrapolation, or any other form of prediction known in the art. Some implementations perform k-means clustering with more clusters, i.e. k>2.

FIG. 4 illustrates an example method 400 for determining a pixel's background color value range in an implementation of the invention. Method 400 is computer implemented and includes the following steps.

Step 410—Initializing a first frame as a current frame. The method iterates through the frames in the video sequence, and may start at any frame. Iteration may be linear going forward, or linear going backward, or progressing through any permutation of the frames.

Step 420—Determining if the current frame is available. A frame may not be available if it is masked. With respect to the method in FIG. 9, a frame may not be available if a background object associated with the pixel is not potentially visible in the frame (when the main camera moves, the background object may be outside of the camera's perspective or it may be occluded by another object). Method 400 limits clustering to available frames.

Step 430—Upon determining that the current frame is not available, updating a next frame as the current frame, and returning to Step 420.

Step 440—Upon determining that the current frame is available, converting the pixel color value to a perceptually linear color space and including the converted pixel color value for clustering in Step 470. In some implementations, the perceptually linear color space may be or include CIELAB. In some further implementations, the color conversion may have been performed at an earlier stage, and Step 440 reduces to including the converted pixel color value for clustering in Step 470.

Step 450—Determining if all frames have been iterated.

Step 460—Upon determining that not all frames have been iterated, updating a next frame as the current frame, and returning to Step 420.

Step 470—Upon determining that all frames have been iterated, performing clustering in k clusters. In some implementations, k equals 2. In other implementations, k may be larger than 2. Performing clustering may include using a k-means algorithm, or any other clustering algorithm known in the art. Experiments by the inventors have taught that with two clusters, the background colors will be in the cluster with more samples, while the colors of the other cluster may be much wider distributed.

Step 480—Determining the background color value range from boundaries of the cluster with the most members. Some implementations skip this explicit step, since it is possible to determine if a pixel's color value is within the background color value range by feeding the color value to the clustering algorithm, and letting the clustering algorithm decide if the pixel is classified in the cluster with the most members.

FIG. 5 illustrates an example scene 500 with initial and final camera positions and orientations according to an implementation of the invention. Scene 500 is filmed by a moving camera, with initial camera specifications 510 and final camera specifications 520. While the camera is moving, not only its position and orientation may change, but also its zoom factor and other configuration parameters. For the purpose of this patent document, the camera position, orientation, zoom factor, and other relevant configuration parameters are referred to as the camera specifications. Scene 500 includes several objects, including tall block 530, small cube 540, and larger cube 550. FIG. 6 illustrates a perspective 600 from the initial camera position and orientation (or camera specifications) in FIG. 5. FIG. 7 illustrates a perspective 700 from the final camera position and orientation (or camera specifications) in FIG. 5. Between initial camera specifications 510 and final camera specifications 520, the camera moves sideward, rotates around its vertical axis, moves upwards, and rotates around a horizontal axis. It may also change its zoom factor and other relevant configuration parameters. As a result, between perspective 600 and perspective 700, the apparent shapes (as seen in a two-dimensional projection) of the objects and background change, surface colors may shift because the surfaces are viewed from different angles, and small cube 540 becomes concealed behind larger cube 550. While method 100 and method 200 assume fixed camera specifications, they can be extended to support changing camera specifications by transforming frames to correspond to the initial (or any later) camera specifications. One approach is to associate pixels with a geometry in a three-dimensional space. The geometry may be known from prior information or may be derived while capturing the sequence. Depth information must be available for a sufficient set of pixels in at least one frame, and the camera specifications must be accurately known as the camera moves and captures successive frames. Most cameras provide two-dimensional frames, where pixel coordinates associate with an angle from the camera's forward axis, but regular cameras don't provide depth information. The depth information may be obtained in several ways, for example by using a LiDAR (Light Detection and Ranging) sensor in parallel with the camera at the time of recording the first frame, or throughout the recording's duration, or by using the LiDAR sensor beforehand or afterwards. Some implementations may record the scene from multiple angles (with one or more cameras) to allow for depth triangulation. By using the depth information, an implementation may derive at least parts of the geometry that includes background and objects of the scene being recorded by the camera.

FIG. 8 illustrates a method 800 for determining a pixel's background color value range for a video sequence recorded by a main camera. The main camera might move, and its camera specifications may change otherwise during the recording of the video sequence. Method 800 is an extension of method 200 and assumes that the main camera's specifications are accurately known for each frame in the video sequence. An implementation may perform the steps in method 800 for each first pixel in a first frame that is associated with a geometry. Method 800 comprises:

Step 810—determining a first color value of the first pixel based on coordinates for the pixel in the first frame, wherein the first frame is shot with a first camera specifications.

Step 820—matching the first pixel to a location in the geometry by calculating a first angle and a first depth for the first pixel based on the coordinates (in the first frame) for the first pixel and the first camera specification. For example, the first pixel's coordinate along the x-axis associates with an angle to the left or to the right of the main camera's forward axis, and the first pixel's coordinate along the y-axis associates with an upward or downward angle from the main camera's forward axis. The implementation may determine the first depth from a measurement by a LiDAR sensor, or from correlation and/or triangulation with the measurement by the LiDAR or by one or more auxiliary cameras. The implementation may use a deep neural network to determine the first depth from camera and LiDAR or auxiliary camera information, based on on-the-set training of the neural network prior to the recording. Some implementations may use other frames to accurately triangulate depth information.

Step 830—based on the location in the geometry and a second camera specification associated with a second frame (using the second angle and the second depth), validating potential visibility of the location in the geometry in the second frame. The validation will be further described with reference to FIG. 9.

Step 840—upon having confirmed potential visibility of the location in the geometry for the second frame, calculating coordinates for a second pixel (associated with the location in the geometry) in the second frame and determining a second color value of the pixel. The implementation may calculate the coordinates in the second frame from the second angle.

Step 850—upon not having positively validated the second angle and second depth for the pixel for the second frame, excluding the second frame for this pixel.

Method 800 may repeat Step 810 through Step 850 for additional frames and camera specifications, and when done, proceed with Step 220 in method 200 for another pixel.

FIG. 9 illustrates detailed steps of validating potential visibility of the location in the geometry in the second frame in an implementation 900 of the invention. Not necessarily all frames must be included in building a pixel's background color model. If the location in the geometry associated with the first pixel in the first frame of method 800 is not potentially visible in a second frame, then the second frame must be excluded from the statistical analysis. Consider small cube 540 in FIG. 6. In the initial perspective, its front, top, and right-hand side are visible. Thus, initial perspective 600 includes pixels showing details of small cube 540. However, in the final perspective 700, small cube 540 is concealed by larger cube 550. Thus, transformed pixels for small cube 540 in perspective 700 must be excluded from an analysis related to perspective 600. Similarly, transformed pixels at the location of small cube 540 in perspective 600 must be excluded from a statistical analysis related to perspective 700. Similarly, when a camera moves, some objects may move out of view, and other objects may move into view. Thus, an implementation must check if an object remains in view. Implementation 900 comprises the following steps performed on a pixel.

Step 910—calculating a second angle and a second depth for the location in the geometry relative to the second camera specifications.

Step 920—determining if coordinates associated with the second angle are included in the second frame. If the coordinates are not included in the second frame, then the pixel has been rotated out of view, or zoomed out of view, for the second camera specifications. Thus, its color cannot be determined, and the second frame cannot be included in the analysis for creating the background data model.

Step 930—upon determining that the coordinates associated with the second angle are not included in the second frame, denying potential visibility. The implementation does not include the second frame for creating the background data model for this location in the geometry.

Step 940—upon determining that the coordinates associated with the second angle are included in the second frame, determining if the second depth is visible at the second angle in the second frame. If another object is known to be closer to the camera at the second angle in the second frame, then the object visible in the first frame at the first pixel's location is concealed in the second frame. Thus, its color cannot be determined, and the second frame cannot be included in the analysis for creating the background data model.

Step 950—upon determining that the second depth is not visible at the second angle in the second frame, denying potential visibility. The implementation does not include the second frame for creating the background data model for this location in the geometry.

Step 960—upon determining that the coordinates associated with the second angle are included in the second frame, and that the second depth is visible at the second angle in the second frame, confirming the potential visibility of the location in the geometry in the second frame. The visibility is potential, because the location in the geometry may still be occluded by a moving or temporary foreground object.

For example, FIG. 10 illustrates an example of visual content generation system 1000 as might be used to generate imagery in the form of still images and/or video sequences of images. The visual content generation system 1000 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 1000 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 1000 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows. Images might or might not be stored in a compressed format, but either way, a desired image may be represented as a two-dimensional array of pixel color values. In another variation, images are represented by a pair of stereo images for three-dimensional presentations and in other variations, some of the image output, or all of it, might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some implementations, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera specification. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 10, a live action capture system 1002 captures a live scene that plays out on a stage 1004. The live action capture system 1002 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, camera 1006(1) and camera 1006(2) capture the scene, while in some systems, there might be other sensor(s) 1008 that capture information from the live scene (e.g., infrared cameras, infrared sensors, motion capture ("mo-cap") detectors, etc.). On the stage 1004, there might be human actors, animal actors, inanimate objects, background objects, and possibly an object such as a green screen 1010 that is designed to be captured in a live scene recording in such a way that it is easily overlaid with computer-generated imagery. The stage 1004 might also contain objects that serve as fiducials, such as fiducials 1012(1)-(3), that might be used post-capture to determine where an object was during capture. A live action scene might be illuminated by one or more lights, such as an overhead light 1014.

During or following the capture of a live action scene, the live action capture system 1002 might output live action footage to a live action footage storage 1020. A live action processing system 1022 might process live action footage to generate data about that live action footage and store that data into a live action metadata storage 1024. The live action processing system 1022 might include computer processing capabilities, image processing capabilities, one or more processors, program code storage for storing program instructions executable by the one or more processors, as well as user input devices and user output devices, not all of which are shown. The live action processing system 1022 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of the overhead light 1014, as that might be useful in post-processing to match computer-generated lighting on objects that are computer-generated and overlaid on the live action footage. The live action processing system 1022 might operate autonomously, perhaps based on predetermined program instructions, to generate and output the live action metadata upon receiving and inputting the live action footage. The live action footage can be camera-captured data as well as data from other sensors.

An animation creation system 1030 is another part of the visual content generation system 1000. The animation creation system 1030 might include computer processing capabilities, image processing capabilities, one or more processors, program code storage for storing program instructions executable by the one or more processors, as well as user input devices and user output devices, not all of which are shown. The animation creation system 1030 might be used by animation artists, managers, and others to specify details, perhaps programmatically and/or interactively, of imagery to be generated. From user input and data from a database or other data source, indicated as a data store 1032, the animation creation system 1030 might generate and output data representing objects (e.g., a horse, a human, a ball, a teapot, a cloud, a light source, a texture, etc.) to an object storage 1034, generate and output data representing a scene into a scene description storage 1036, and/or generate and output data representing animation sequences to an animation sequence storage 1038.

Scene data might indicate locations of objects and other visual elements, values of their parameters, lighting, camera location, camera view plane, and other details that a rendering engine 1050 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 1030 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 1034 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from the data store 1032 might be used to drive object presentation. For example, if an artist is creating an animation of a spaceship passing over the surface of the Earth, instead of manually drawing or specifying a coastline, the artist might specify that the animation creation system 1030 is to read data from the data store 1032 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1044 might read in live action metadata, such as data representing movements and positions of body parts of a live actor during a live action scene. The animation driver generator 1044 might generate corresponding animation parameters to be stored in the animation sequence storage 1038 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 1022. The animation driver generator 1044 might convert that movement data into specifications of how joints of an articulated CGI character are to move over time.

The rendering engine 1050 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. The rendering engine 1050 might include computer processing capabilities, image processing capabilities, one or more processors, program code storage for storing program instructions executable by the one or more processors, as well as user input devices and user output devices, not all of which are shown.

The visual content generation system 1000 can also include a merging system 1060 that merges live footage with animated content. The live footage might be obtained and input by reading from the live action footage storage 1020 to obtain live action footage, by reading from the live action metadata storage 1024 to obtain details such as presumed segmentation in captured images segmenting objects in a live action scene from their background (perhaps aided by the fact that the green screen 1010 was part of the live action scene), and by obtaining CGI imagery from the rendering engine 1050.

The merging system 1060 might also read data from rulesets for merging/combining storage 1062. A very simple example of a rule in a ruleset might be "obtain a full image including a two-dimensional pixel array from live footage, obtain a full image including a two-dimensional pixel array from the rendering engine 1050, and output an image where each pixel is a corresponding pixel from the rendering engine 1050 when the corresponding pixel in the live footage is a specific color of green, otherwise output a pixel value from the corresponding pixel in the live footage."

The merging system 1060 might include computer processing capabilities, image processing capabilities, one or more processors, program code storage for storing program instructions executable by the one or more processors, as well as user input devices and user output devices, not all of which are shown. The merging system 660 might operate autonomously, following programming instructions, or might have a user interface or programmatic interface over which an operator can control a merging process. In some implementations, an operator can specify parameter values to use in a merging process and/or might specify specific tweaks to be made to an output of the merging system 1060, such as modifying boundaries of segmented objects, inserting blurs to smooth out imperfections, or adding other effects. Based on its inputs, the merging system 660 can output an image to be stored in a static image storage 1070 and/or a sequence of images in the form of video to be stored in an animated/combined video storage 1072.

Thus, as described, the visual content generation system 1000 can be used to generate video that combines live action with computer-generated animation using various components and tools, some of which are described in more detail herein. While the visual content generation system 1000 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one implementation, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 11:
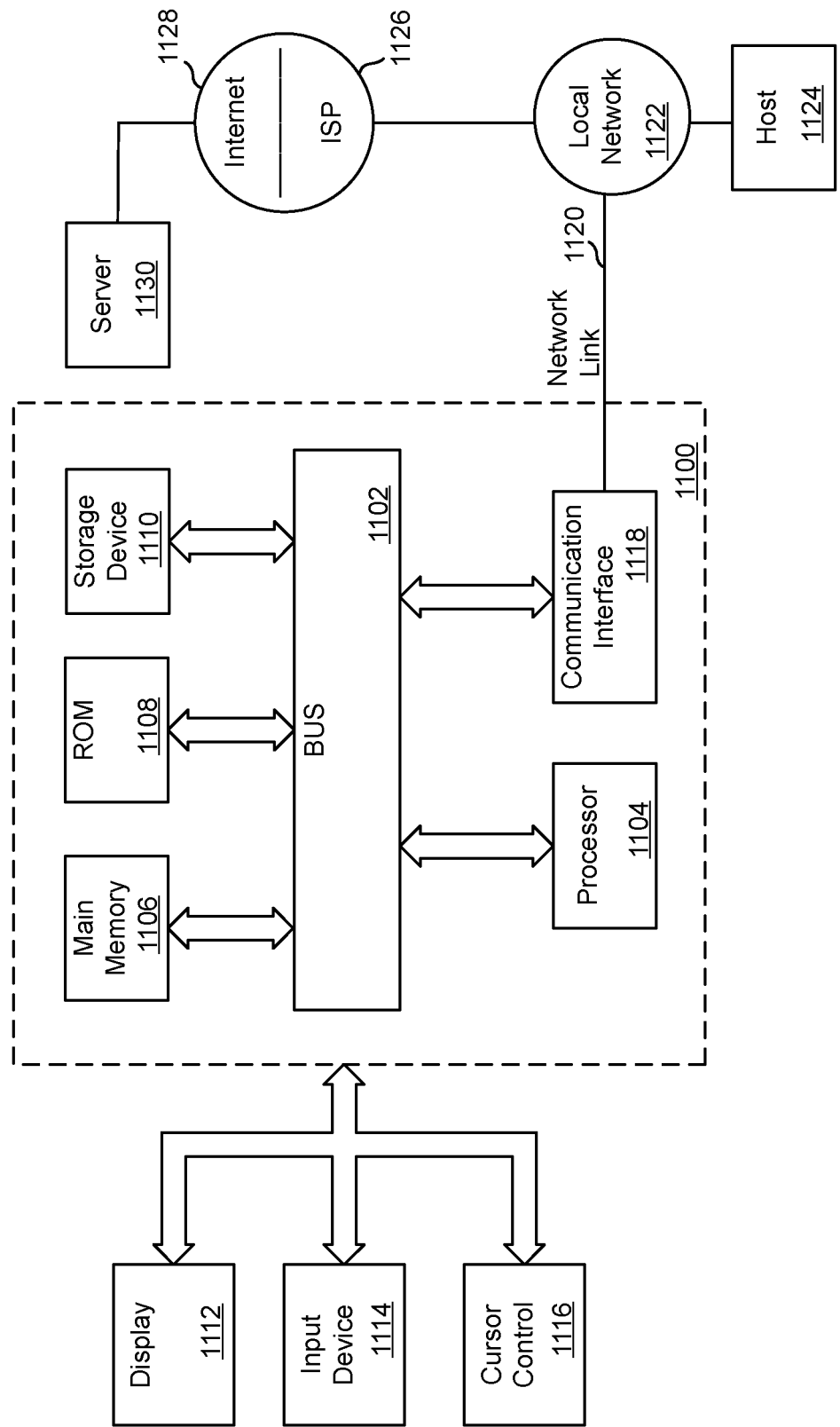
FIG. 11 is a block diagram of an exemplary computer system for use with implementations described herein.

For example, FIG. 11 is a block diagram that illustrates a computer system 1100 upon which the computer systems of the systems described herein and/or the visual content generation system 1000 (see FIG. 10) may be implemented. The computer system 1100 includes a bus 1102 or other communication mechanism for communicating information, and a processor 1104 coupled with the bus 1102 for processing information. The processor 1104 may be, for example, a general-purpose microprocessor.

The computer system 1100 also includes a main memory 1106, such as a random-access memory (RAM) or other dynamic storage device, coupled to the bus 1102 for storing information and instructions to be executed by the processor 1104. The main memory 1106 may also be used for storing temporary variables or other intermediate information during execution of instructions to be executed by the processor 1104. Such instructions, when stored in non-transitory storage media accessible to the processor 1104, render the computer system 1100 into a special-purpose machine that is customized to perform the operations specified in the instructions.

The computer system 1100 further includes a read only memory (ROM 1108) or other static storage device coupled to the bus 1102 for storing static information and instructions for the processor 1104. A storage device 1110, such as a magnetic disk or optical disk, is provided and coupled to the bus 1102 for storing information and instructions.

The computer system 1100 may be coupled via the bus 1102 to a display 1112, such as a computer monitor, for displaying information to a computer user. An input device 1114, including alphanumeric and other keys, is coupled to the bus 1102 for communicating information and command selections to the processor 1104. Another type of user input device is a cursor control 1116, such as a mouse, a trackball, or cursor direction keys for communicating direction information and command selections to the processor 1104 and for controlling cursor movement on the display 1112. This input device typically has two degrees of freedom in two axes, a first axis (e.g., x) and a second axis (e.g., y), that allows the device to specify positions in a plane.

The computer system 1100 may implement the techniques described herein using customized hard-wired logic, one or more ASICs or FPGAs, firmware and/or program logic which in combination with the computer system causes or programs the computer system 1100 to be a special-purpose machine. According to one implementation, the techniques herein are performed by the computer system 1100 in response to the processor 1104 executing one or more sequences of one or more instructions contained in the main memory 1106. Such instructions may be read into the main memory 1106 from another storage medium, such as the storage device 1110. Execution of the sequences of instructions contained in the main memory 1106 causes the processor 1104 to perform the process steps described herein. In alternative implementations, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile (or non-transitory) media includes, for example, optical or magnetic disks, such as the storage device 1110. Volatile media includes dynamic memory, such as the main memory 1106. Common forms of non-transitory storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 1102. Transmission media can also take the form of acoustic or light waves, such as those generated during radio-wave and infra-red data communications.

Various forms of media may be involved in carrying one or more sequences of one or more instructions to the processor 1104 for execution. For example, the instructions may initially be carried on a magnetic disk or solid-state drive of a remote computer. The remote computer can load the instructions into its dynamic memory and send the instructions over a network connection. A modem or network interface local to the computer system 1100 can receive the data. The bus 1102 carries the data to the main memory 1106, from which the processor 1104 retrieves and executes the instructions. The instructions received by the main memory 1106 may optionally be stored on the storage device 1110 either before or after execution by the processor 1104.

The computer system 1100 also includes a communication interface 1118 coupled to the bus 1102. The communication interface 1118 provides a two-way data communication coupling to a network link 1120 that is connected to a local network 1122. For example, the communication interface 1118 may be a network card, a modem, a cable modem, or a satellite modem to provide a data communication connection to a corresponding type of telephone line or communications line. Wireless links may also be implemented. In any such implementation, the communication interface 1118 sends and receives electrical, electromagnetic, or optical signals that carry digital data streams representing various types of information.

The network link 1120 typically provides data communication through one or more networks to other data devices. For example, the network link 1120 may provide a connection through the local network 1122 to a host computer 1124 or to data equipment operated by an Internet Service Provider (ISP 1126). The ISP 1126 in turn provides data communication services through the world-wide packet data communication network now commonly referred to as the Internet 1128. The local network 1122 and Internet 1128 both use electrical, electromagnetic, or optical signals that carry digital data streams. The signals through the various networks and the signals on the network link 1120 and through the communication interface 1118, which carry the digital data to and from the computer system 1100, are example forms of transmission media.

The computer system 1100 can send messages and receive data, including program code, through the network(s), the network link 1120, and communication interface 1118. In the Internet example, a server 1130 might transmit a requested code for an application program through the Internet 1128, ISP 1126, local network 1122, and communication interface 1118. The received code may be executed by the processor 1104 as it is received, and/or stored in the storage device 1110, or other non-volatile storage for later execution.

Considerations

Although the description has been described with respect to particular implementations thereof, these particular implementations are merely illustrative, and not restrictive.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Any suitable programming language can be used to implement the routines of particular implementations including Python, Haskell, C++, C, Java, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a tangible, non-transitory computer-readable information storage medium for use by or in connection with the instruction execution system, apparatus, system, or device. Particular implementations can be implemented in the form of control logic in software or hardware or a combination of both. The control logic, when executed by one or more processors, may be operable to perform that which is described in particular implementations. For example, a tangible, non-transitory computer-readable information storage medium such as a hardware storage device can be used to store the control logic, which can include executable instructions.

Particular implementations may be implemented by using a programmed general-purpose digital computer, by using application specific integrated circuits, programmable logic devices, field programmable gate arrays, optical, chemical, biological, quantum or nano-engineered systems, components and mechanisms may be used. In general, the functions of particular implementations can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A computer-implemented method for removing information from a video sequence that includes frames associated with a geometry, recorded by a main camera with known changing camera specifications, the method comprising:
for each pixel, not excluded by a mask, in a first frame recorded with a first camera specification:
(A) determining a color value of said each pixel;
(B) matching said each pixel to a location in the geometry by calculating an angle and a depth for said each pixel based on the coordinates for said each pixel and the first camera specification;
(C) for each frame in at least a subset of the frames in the video sequence not including the first frame:
(i) validating a potential visibility of the matched location in the geometry in said each frame based on the matched location in the geometry and a second camera specification associated with said each frame; and
(ii) upon confirming the potential visibility, determining a pixel in said each frame based on the matched location in the geometry and the second camera specification, and
(iii) determining a color value of the determined pixel;
(D) performing a statistical analysis of color values determined in (A)-(C) to determine a background color value range for said each pixel in the first frame;
for each pixel in each frame in the video sequence other than the first frame:
(E) determining a location in the geometry based on the coordinates of said each pixel in said each frame and a camera specification of said each frame;
(F) determining a pixel in the first frame based on the determined location in the geometry and the camera specification of the first frame;
(G) determining whether a color value of said each pixel in said each frame is outside of the background color range for the determined pixel in the first image;
(H) upon determining that said color value is outside of the background color value range for the determined pixel in the first image, replacing the color value of said each pixel in said each frame with a color value obtained from the color values in the background color value range for the determined pixel in the first image.

2. The computer-implemented method of claim 1, wherein the statistical analysis includes determining a prevalent color cluster.

3. The computer-implemented method of claim 2, wherein determining the prevalent color cluster includes:
clustering in k clusters of pixel color values.

4. The computer-implemented method of claim 3, wherein clustering includes k-means clustering.

5. The computer-implemented method of claim 3, wherein k equals 2 and the prevalent color cluster is a color cluster with a largest number of pixel color values.

6. The computer-implemented method of claim 3, further comprising converting a pixel color value to a perceptually linear color space.

7. The computer-implemented method of claim 6, wherein the perceptually linear color space comprises CIELAB.

8. The computer-implemented method of claim 1, wherein determining the background color value range includes using interpolation or extrapolation with at least a quadratic equation.

9. The computer-implemented method of claim 1, wherein the geometry is at least partially derived from the first frame by matching pixels in the first frame to pixels in a LiDAR scan to obtain depth values for the pixels in the first frame.

10. The computer-implemented method of claim 1, wherein the geometry is at least partially derived from the first frame by matching pixels in the first frame to pixels in a second frame, captured by a second camera, and triangulating depth values from known camera specifications of the main camera and the second camera.

11. The computer-implemented method of claim 1, wherein the geometry is at least partially derived from the first frame by matching pixels from the first frame to pixels from a second frame and triangulating depths from known camera specifications of the main camera at the recording times of the first frame and the second frame.

12. The computer-implemented method of claim 1, wherein validating the potential visibility of the location in the geometry in said each frame comprises:
calculating a second angle and a second depth of the location in the geometry relative to the second camera specification;
determining if coordinates associated with the second angle are included in said each frame;
upon determining that the coordinates associated with the second angle are included in said each frame, determining if the second depth is not occluded at the second angle in said each frame; and
upon determining that the coordinates associated with the second angle are included in said each frame, and that the second depth is not occluded at the second angle in said each frame, confirming the potential visibility.

13. An apparatus comprising:
one or more processors; and
logic encoded in one or more tangible non-transitory media for execution by the one or more processors and when executed operable to remove information from a video sequence that includes frames associated with a geometry and recorded by a main camera with known changing camera specifications:
for each pixel, not excluded by a mask, in a first frame recorded with a first camera specification:
(A) determining a color value of said each pixel;
(B) matching said each pixel to a location in the geometry by calculating an angle and a depth for said each pixel based on the coordinates for said each pixel and the first camera specification;
(C) for each frame in at least a subset of the frames in the video sequence not including the first frame:
(i) validating a potential visibility of the matched location in the geometry in said each frame based on the matched location in the geometry and a second camera specification associated with said each frame; and
(ii) upon confirming the potential visibility, determining a pixel in said each frame based on the matched location in the geometry and the second camera specification, and
  (iii) determining a color value of the determined pixel;
  (D) performing a statistical analysis of color values determined in (A)-(C) to determine a background color value range for said each pixel in the first frame;
for each pixel in each frame in the video sequence other than the first frame:
  (E) determining a location in the geometry based on the coordinates of said each pixel in said each frame and a camera specification of said each frame;
  (F) determining a pixel in the first frame based on the determined location in the geometry and the camera specification of the first frame;
  (G) determining whether a color value of said each pixel in said each frame is outside of the background color range for the determined pixel in the first image;
  (H) upon determining that said color value is outside of the background color value range for the determined pixel in the first image, replacing the color value of said each pixel in said each frame with a color value obtained from the color values in the background color value range for the determined pixel in the first image.

14. A non-transitory computer-readable storage medium comprising instructions which, when executed by a computer, cause the computer to remove information from a video sequence including frames associated with a geometry and recorded by a main camera with known changing camera specifications by:
  for each pixel, not excluded by a mask, in a first frame recorded with a first camera specification:
    (A) determining a color value of said each pixel;
    (B) matching said each pixel to a location in the geometry by calculating an angle and a depth for said each pixel based on the coordinates for said each pixel and the first camera specification;
  (C) for each frame in at least a subset of the frames in the video sequence not including the first frame:
    (i) validating a potential visibility of the matched location in the geometry in said each frame based on the matched location in the geometry and a second camera specification associated with said each frame; and
    (ii) upon confirming the potential visibility, determining a pixel in said each frame based on the matched location in the geometry and the second camera specification, and
    (iii) determining a color value of the determined pixel;
  (D) performing a statistical analysis of color values determined in (A)-(C) to determine a background color value range for said each pixel in the first frame;
for each pixel in each frame in the video sequence other than the first frame:
  (E) determining a location in the geometry based on the coordinates of said each pixel in said each frame and a camera specification of said each frame;
  (F) determining a pixel in the first frame based on the determined location in the geometry and the camera specification of the first frame;
  (G) determining whether a color value of said each pixel in said each frame is outside of the background color range for the determined pixel in the first image;
  (H) upon determining that said color value is outside of the background color value range for the determined pixel in the first image, replacing the color value of said each pixel in said each frame with a color value obtained from the color values in the background color value range for the determined pixel in the first image.

* * * * *